United States Patent [19]

Schönberger et al.

[11] Patent Number: 4,600,991
[45] Date of Patent: Jul. 15, 1986

[54] INTEGRATED MICROPROGRAMMED DEVICE FOR CONTROLLING INFORMATION PROCESSING CYCLES, AND A METHOD FOR OPERATING THE SAME

[75] Inventors: Franz Schönberger; Hans Stadlmeier; Reinhold Brunner; Wolfgang Wagner, all of Munich, Fed. Rep. of Germany

[73] Assignee: Siemens Aktiengesellschaft, Berlin and Munich, Fed. Rep. of Germany

[21] Appl. No.: 549,583

[22] Filed: Nov. 7, 1983

[30] Foreign Application Priority Data

Nov. 9, 1982 [DE] Fed. Rep. of Germany ....... 3241378

[51] Int. Cl.⁴ ................................................. G06F 1/04

[52] U.S. Cl. ..................................................... 364/200
[58] Field of Search ... 364/200 MS File, 900 MS File

[56] References Cited

U.S. PATENT DOCUMENTS 4,112,490  9/1978  Pohlman et al. .................... 364/200

Primary Examiner—Raulfe B. Zache
Attorney, Agent, or Firm—Herbert L. Lerner; Laurence A. Greenberg

[57] ABSTRACT

An integrated microprogrammed device for controlling information processing cycles, includes a device for generating one or more T-states in dependence on preceding T-states and on given parameters and a method for operating the device.

21 Claims, 10 Drawing Figures

FIG 5
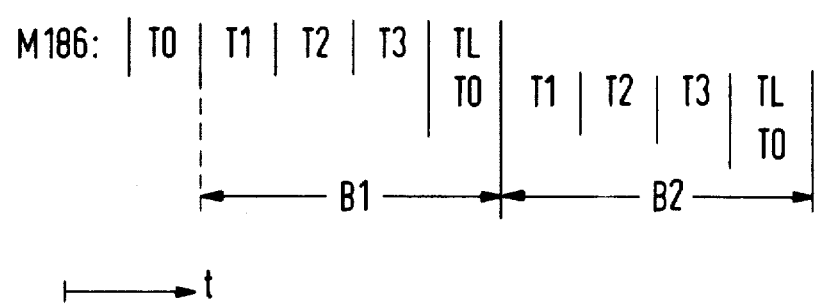
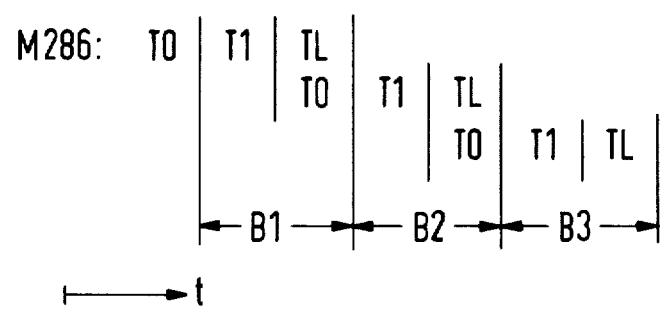

FIG 8

T-STATE: NTI (NT0 V NT1 V NT2 V NT3)-Q

| | T-STATE: | NTYB | BE | U:M 186 | U:M 286 |
|---|---|---|---|---|---|
| 01 | TVE ← TI TL-Q | | | 4 | 4 |
| 02 | T2 ← TW-Q | | | 8 | - |
| 03 | TVB ← T3 | | PRIOVLD-Q | 11,27 | - |
| 04 | TVB ← T3 | | ORGMKWAIT | 11,27 | - |
| 05 | TVE ← T0 | | M186 ← ISTE-Q | 25,20 | - |
| 06 | TVB ← T1 | | PRIOVLD-Q | 25,21 | 13,15,16 |
| 07 | TVB ← TL | | M186 ← ORGMKWAIT | 21 | - |
| 08 | TVE ← TL ← TI | | M186 | 24 | - |
| 09 | TVB ← T3 | | IREADY-Q | 27 | - |
| 10 | TVE ← T0 | | M186-Q ← BIUSPLIT-Q ← ISTE | - | 6,9 |
| 11 | TVE ← T1 | | IREADY | - | 12 |
| 12 | TVB ← T1 | | PRIOVLD-Q | - | 14 |
| 13 | TVB ← T1 | | ORGMKWAIT | - | 14 |
| 14 | TVB ← TL | | M186-Q ← RDWR ← ORGMKWAIT | - | 15,16 |
| 15 | TVB ← TL | | M186-Q ← IREADY ← ORGMKWAIT | - | 16 |
| 16 | TVE ← TL | | IREADY ← ISTE-Q | - | 19 |
| 17 | TW ← T0 | ← | M186-Q ← ISTE | - | 23 |
| 18 | TVE ← T0 | | M186-Q ← REQVLD-Q ← ISTE-Q | - | 27,19,24 |
| 19 | TVE ← T0 ← TL-Q | | M186-Q ← ISTE-Q | - | 27 |

T-STATE: NTVE

| | | NTVE | BE | U:M 186 | U:M 286 |
|---|---|---|---|---|---|
| 20 | TVB ← TI ← TL-Q | | PRIOVLD | 3,5 | 3,5 |
| 21 | TVB ← T3 | ← | IREADY ← PRIOVLD ← ORGMKWAIT-Q | 9,10 | - |

FIG 9 (CONTINUED FROM FIG. 8)

| # | T-state transition | | Signal | Condition | | |
|---|---|---|---|---|---|---|
| 22 | TVB ← T3 | | | IREADY · RDWR-Q · PRIOVLD | 10 | - |
| 23 | TVB ← T1 | | | PRIOVLD · ORGMKWAIT-Q | 22,23,3,5 | 5,17,18,25,28,3 |
| 24 | TVB ← T1 | | | PRIOVLD · RDWR-Q | 3,23 | 17,28,3 |
| 25 | TVB ← T1 | | | PRIOVLD · ORGMKWAIT-Q | - | 7,10 |
| 26 | TVE ← TL | ← T0 | | ISTE-Q · REQVLD | - | 8 |
| 27 | TVB ← T1 | | | RDWR-Q · PRIOVLD | - | 10 |
| 28 | TVE ← TL | ← T1 | M186-Q | IREADY-Q | - | 11 |
| | T-STATE: | NT0 | | BE | | |
| 29 | TVB ← T1 | ← TL-Q | | RDWR · PRIOVLD | 5 | 5 |
| 30 | TVB ← T3 | | | IREADY · PRIOVLD · RDWR · ORGMKWAIT-Q | 9 | - |
| 31 | TW ← T3 | | | IREADY | 17 | - |
| 32 | TVB ← T1 | | | RDWR · PRIOVLD · ORGMKWAIT-Q | 22,5 | 5,18,25 |
| 33 | TVB ← T1 | | | RDWR · PRIOVLD · ORGMKWAIT-Q | - | 7 |
| 26 | TVE ← TL | ← T0 | M186-Q | ISTE-Q · REQVLD | - | 8 |
| 34 | TW ← T1 | | M186-Q | | - | 21 |
| 35 | TW ← T0 | | M186-Q | ISTE-Q | - | 22 |
| | T-STATE: | NT1 | | BE | | |
| 36 | T0 ← | | | ISTE | 6,14,12,13,18 | 6,9,20,23,26 |
| | T-STATE: | NT2 | | BE | | |
| 37 | T1 ← | | | M186 | 7,15 | - |
| | T-STATE: | NT3 | | BE | | |
| 38 | T2 | | | | 8,16 | - |

FIG 10 (CONTINUED FROM FIG. 9)

| | T-STATE: | | | | | |
|---|---|---|---|---|---|---|
| 37 | T3 | ← | | | IREADY-Q | 27,19 | - |
| | T-STATE: | | NT1 | | BE | | |
| 40 | T3 | ← | | | IREADY | 9,10,11,17 | - |
| 41 | T1 | ← | | M186-Q ← | IREADY-Q | - | 7,10,14,21 |
| 28 | TVE ← TL | | ← TI | M186-Q ← | IREADY-Q | - | 11 |
| 42 | TVB ← TL | | ← TI | M186-Q ← | ISTE-Q | - | 15,25,28 |
| 36 | TW ← TO | | ← TO | M186-Q ← | IREADY-Q ← ISTE-Q | - | 22 |
| 43 | TVE ← TL | | ← TO | M186-Q ← | | - | 24,8 |
| | T-STATE: | | NTW | | BE | | |
| 44 | TVE ← TO | | ← | | BIUSPLIT ← ISTE | 14,13 | 20,26 |
| 45 | TW ← T1 | | | | | 15 | 21 |
| 46 | TW ← T2 | | | | | 16 | - |
| 47 | TW ← T3 | | | | | 17,19 | - |
| 48 | TW ← TO | | ← | M186-Q ← | ISTE-Q | - | 22 |

INTEGRATED MICROPROGRAMMED DEVICE FOR CONTROLLING INFORMATION PROCESSING CYCLES, AND A METHOD FOR OPERATING THE SAME

The invention relates to an integrated microprogrammed device for controlling information processing cycles, and a method for operating the same.

An integrated microprogrammed device of the type mentioned above is provided in order to permit a connection to modules iAPX 186 and iAPX 286 of the BUS concept INTEL family of modules. Such a device is therefore equipped with two different BUS interfaces. This type of device should therefore be able to operate with the BUS timings of INTEL central units iAPX 186 or iAPX 286. The iAPX 186 module, referred to as "M186" for short, is also BUS-CYCLE compatible with INTEL central units 8086 and 8088. Because of the different BUS interfaces of the two modes (demultiplex BUS in M286, multiplex BUS in M186), different minimum execution times are required for working-up a BUS cycle. Thus, for instance, four process cycles, called "T-states" for short, are necessary in the M186, while a BUS cycle with two T-states can be worked-up in the M286. If an integrated microprogrammed device of the type mentioned above cooperates with a central processing unit (CPU) at the BUS, two kinds of BUS cycles must be distinguished, namely the so-called "active BUS cycle" if the integrated microprogrammed device itself requires the BUS for processing information, and the "passive BUS cycle" if the central processing unit (CPU) servicing the integrated microprogrammed device requires the BUS for itself and accesses the integrated microprogrammed device. During a "passive BUS cycle", the integrated microprogrammed device therefore behaves like a memory, i.e. the central processing unit (CPU) can engage an internal control, address or data register of the integrated microprogrammed device either in writing or in reading. During this "passive BUS cycle", the integrated microprogrammed device is in a so-called "idle state" (TI). A number of T-states are required for working up an "active BUS cycle", which cause specific actions at the "external BUS interface" as a function of the module mode.

In the M286, the following T-states are defined with the most important actions listed in the description: T0, T1 and TL. In the M186, the following T-states are defined with the most important actions listed in the description: T0, T1, T2, T3 and TL. A so-called "idle state" (TI) which is always present if none of the external activities T0, T1, T2 or T3 mentioned above are to take place, is also common to the M186 and M286. In prior art devices, the requirements for cycle control have been extensive.

It is accordingly an object of the invention to provide an integrated microprogrammed device for controlling information processing cycles, and a method for operating the same, which overcomes the hereinafore-mentioned disadvantages of the heretofore-known devices and methods of this general type, and to minimize the requirements as to cycle control.

With the foregoing and other objects in view there is provided, in accordance with the invention, an integrated microprogrammed device for controlling information processing cycles, comprising means for generating one or more T-states in dependence on preceding T-states and on given parameters.

In accordance with another feature of the invention, there are provided means connected to the generating means for selecting a microcommand and for storing the microcommand for a given interim period.

In accordance with a further feature of the invention, there are provided means connected to the generating means for storing an external address for a given interim period.

In accordance with an added feature of the invention, there are provided means connected to the generating means for providing a microcommand sequence address link for a current microcommand address.

In accordance with an additional feature of the invention, there are provided means connected to the generating means for providing a sequence link command.

In accordance with again another feature of the invention, there are provided means connected to the generating means for storing a microcommand address belonging to a current microcommand.

In accordance with again a further feature of the invention, there are provided means connected to the generating means for generating a new external address.

In accordance with again an added feature of the invention, there are provided means connected to the generating means for converting a word access request of a microprogram into an actual byte access request.

In accordance with again an additional feature of the invention, there are provided means connected to the generating means for prioritizing one of a plurality of channels for information transfer.

In accordance with yet another feature of the invention, there are provided means connected to the generating means for switching between given BUS timing modes.

Further in accordance with the objects of the invention there is provided a method for operating an integrated microprogrammed device, including means for generating one or more T-states in dependence on preceding T-states and on given parameters, a microprogram instruction register for a given prioritized channel being connected to the generating means for storing a microcommand, and a microprogram latch connected to the microprogram instruction register, which comprises selecting the microprogram instruction register of the prioritized channel during a T-state, and transferring the microcommand stored in the microprogram instruction register into the microprogram latch.

In accordance with another mode of the invention, there is provided a method including an internal pointer register set connected to the generating means for carrying a pointer address, an interim memory connected to the internal pointer register set, and an address buffer connected to the interim memory, which comprises reading the pointer address from the internal pointer register set, storing the pointer address in the interim memory, and transferring the pointer address to the address buffer during a T-state.

In accordance with a further mode of the invention, there is provided a method including an internal microaddress interim memory connected to the generating means, which comprises providing a sequence link of the current microaddress relative to the same channel, and transferring the sequence link into the internal microaddress interim memory during a T-state.

In accordance with an added mode of the invention, there is provided a method including a microprogram address register connected to the generating means, which comprises providing a sequence microcommand relative to a channel being processed at a given time, writing the sequence microcommand into the microprogram instruction register for a channel, and transferring a corresponding sequence microprogram address into the microprogram address register for a channel during a T-state.

In accordance with an additional mode of the invention, there is provided a method which comprises performing an address pointer addition during a T-state to provide a new external address, and rewriting the new external address into the pointer register.

In accordance with again another mode of the invention, there is provided a method which comprises converting a desired word access of a microprogram into an actual byte access request during a T-state and independently controlling at least one other corresponding byte access without requesting a new microcommand.

In accordance with again a further mode of the invention, there is provided a method which comprises logically concatenating and suitably overlapping the T-states.

In accordance with again an added mode of the invention, there is provided a method which comprises processing at least two microcommands simultaneously.

In accordance with again an additional mode of the invention, there is provided a method which comprises simultaneously placing: a first microcommand in a read phase, a second microcommand in an execution phase, and a third microcommand in a preparation phase.

In accordance with yet another feature of the invention, there is provided a method which comprises simultaneously placing: a first microcommand in a read phase, and a second microcommand in an execution phase.

In accordance with a concomitant mode of the invention, there is provided a method which comprises simultaneously placing a first microcommand in an execution phase, a second microcommand in a preparation phase, and the integrated microprogrammed device in an idle state.

Through the use of a device according to the invention, the above-mentioned T-states can be concatenated or linked logically and can be overlapped suitably, so that the above-mentioned BUS cycle times of two T-states in the M286 mode and of four T-states in the M186 mode, can be obtained. In a microprogrammed device integrated in accordance with the invention, the machine control can be simplified so that it is possible to control the specific hardware complexes of the device according to the invention independently of the operating modes M186 and M286, in such a manner that they are compatible, such as with the prevailing INTEL-BUS timing.

Other features which are considered as characteristic for the invention are set forth in the appended claims.

Although the invention is illustrated and described herein as embodied in an integrated microprogrammed device for controlling information processing cycles, and a method for operating the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 5 is a T-state diagram for BUS cycles in the M186 mode and in the M286 mode;

FIG. 8 is an illustration of transition conditions for the ADMA state diagrams of FIG. 6 and of FIG. 7 for T-state 01–21;

FIG. 9 is a continuation of FIG. 8 showing T-states 22–38, and

FIG. 10 is a continuation of FIG. 8, showing T-states 37–48.

Figure 1:
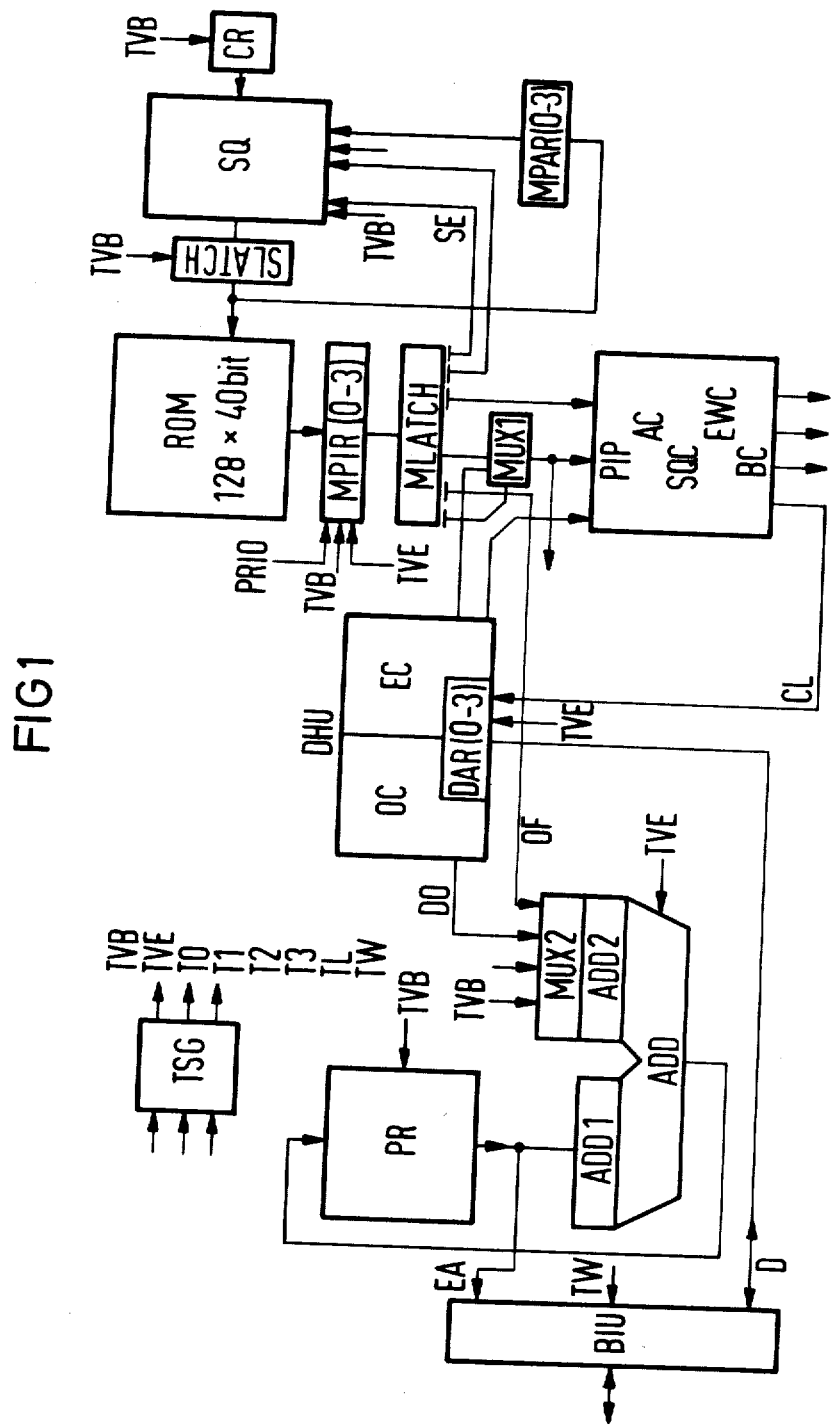
FIG. 1 is a block circuit diagram illustrating the operation of an ADMA (advanced direct memory access controller) according to an embodiment of the invention.

According to the invention, several new T-states specific to an ADMA have been defined, which can be superimposed on the above-mentioned T-states T0, T1, T2, T3, TL and TI according to certain criteria. The advancing T-states are generated by a "T-state generator" TSG which makes a decision or determination, in dependence on respective current T-states and several parameters (IREADY, BUISPLIT, IRESET, PRIOVLD, REQUVLD, ORGMKWAIT, ISTE, RDWR and M186) for a new T-state or for a combination of several T-states always at the beginning of a phase PHI1.

In the M286 ADMA, the following T-states are defined with the most important actions being listed:

T0: State of a BUS cycle:
  Output of the external status for reading or writing, respectively.
  Output of the external address for reading or writing, respectively, access to the address BUS.

T1: First T-state of the M286 ADMA BUS cycle:
  Output of the external address for read or write access, respectively, is maintained at the address BUS.
  Output of the external data in case of a write access on the data BUS.

TL: Completion of the M286 ADMA BUS cycle:
  Output of the external data on the data BUS is maintained in the case of a write access.
  Evaluation of a "READY" signal which must be transmitted by the passive partner of the ADMA; if the passive partner is not ready, a repetition of a TL-state is requested.
  Acceptance of the external data by the data BUS in the case of a read access, if the "READY" signal is activated by the passive partner.

In the M186 ADMA, the following T-states are defined with the most important actions being listed:

T0: Start of a BUS cycle:
  Output of the external status for reading or writing, respectively.

T1: First T-state of the M186 BUS cycle:
  Output of the low-significance 16 bit part of the external address for read or write access, respectively, to the multiplexed address/data BUS (A/D-BUS).

Output of the more significant 4-bit part of the external address for read or write access, respectively, to the multiplexed address/status pins (contact pins).

T2: Second T-state of the M186 ADMA BUS cycle:
Output of the external data on the 16 bit-A/D BUS in the case of a read access.
Output of status information on the multiplexed address/status pins.

T3: Third T-state of the M186 ADMA BUS cycle:
Output of the external data on the 16 bit-A/D BUS in the case of a write access.
Output of status information on the multiplexed address/status pins.
In the case of T3 as well:
Additional evaluation of a "READY" signal which must be transmitted by a passive partner of the ADMA and specifically at the start of the T3-state; if this passive partner of the ADMA is not in readiness, a repetition of the T3-state is requested.
Acceptance of the external data at the end from the T3-state of the 16 bit-A/D-BUS in the case of a read access if a "READY" signal from the passive partner was present at the beginning of the T3-state.

TL: Completion of the M186 ADMA BUS cycle:
Output of status information on the multiplexed address/status pins.
Output of the external data on the 16 bit-A/D-BUS in the case of a write access.

Referring now to the figures of the drawing in detail and first particularly to FIG. 1 thereof, there is seen an illustration of the operation of an ADMA according to the invention. Referring to FIG. 1, the additional T-states TVB (T-state preparation start), TVE (T-state preparation end) and TW (T-state for split case) which are specific for an ADMA according to the invention, will also be explained.

The integrated high-performance DMA-controller ADMA has four channels which are independent of each other and accomplish the data transfer between media (memories, peripheral equipment). The main control of the channels is taken over by microprograms. The sequence of microcommands is controlled by a sequencer SQ. It is the purpose of the T-state TVB to select a microprogram instruction register MPIR of the prioritized channel i, wherein i=0,1,2,3 in the ADMA with a phase PHI1, and to transfer the microcommand into a microprogram latch or memory MLATCH. The microprogram latch MLATCH contains the current microword necessary for working up a BUS cycle or for working up an internal organizational address computation, for the duration of a microcommand. A multiplicity of hardware units of the ADMA receive their instructions directly from the microprogram latch MLATCH.

Each T-state extends over at least two phases PHI1 and PHI2. It is the purpose of the T-state TVB to read a 24-bit pointer address from an internal ADMA pointer register set PR with the phase PHI2, to store the address in an adder latch ADD1 and to transfer the address to an address buffer in a "BUS INTERFACE UNIT" BIU. Among other things, this 24-bit pointer address later serves as an external address for an external read and write operation.

It is another important task of the T-state TVB to provide the sequence address of the current microaddress which is referred to the same channel. This task is assumed by the so-called "SEQUENCER" SQ which makes a decision in dependence on a multiplicity of parameters for one of five different microprogram address continuation possibilities. In this connection, reference is made to the copending U.S. application entiled "Apparatus and Method for the Link-Address Formation of a Sequencer Controlled by a Microprogram", Ser. No. 549,580.

Command and status registers CR are provided for supplying parameters which are required for generating microprogram sequence links. The parameters are always available toward the end of the T-state TVB with the phase PHI1. This means that after passing through the hardware of the sequencer SQ, the microprogram sequence link for the T-state TVE with the phase PHI2 can be taken into the so-called sequencer latch SLATCH. The sequencer latch SLATCH can be referrred to as an internal ROM address latch.

The T-state TVE is normally the sequence T-state if a valid microconstruction was present during the T-state TVB. It is the main purpose of the T-state TVE to provode the next microcommand referred to the channel being worked at the time. Therefore, an internal microcode ROM memory ROM is read during the T-state TVE with the phase PHI1 under the address transferred into the intermediate memory SLATCH during the T-state TVB with the phase PHI2. The output data of the ROM, which are stable with respect to the T-state TVE with the phase PHI2, are written into the channel-specific microprogram instruction register MPIR if the currently worked-up microinstruction is valid. The microprogram address in the intermediate memory SLATCH is transferred into the microprogram address register MPAR which is specific to the channel, simultaneously with the entering of the microinstruction into the register MPIR. It is a further task of the T-state TVE to control an address pointer addition to the phase PHI1. The first operand for this addition is the 24-bit pointer address stored in the intermediate adding memory or latch ADD1 during the T-state TVB with the phase PHI2. The second operand for this addition has been stored in an intermediate addition memory ADD2 in dependence on the microcommand type. This operand is supplied from the microword in the intermediate memory MLATCH through a line OF or by means of an autonomous offset logic within a data processing unit DHU through a line DO, likewise in the T-state TVB with the phase PHI2. A determination as to which operand is stored in the intermediate adding memory ADD2, is made by a multiplexer MUX2.

An adder ADD is also provided for performing an addition, and the result of the addition performed in the adder ADD is rewritten into the 24-bit pointer register set PR under an address predetermined in the microword, if the currently worked-on microinstruction is valid.

In the case of microcommands which relate to the external data transfer, a channel-specific byte counter BC is additionally decremented, in contrast to the internal organization microcommands. This occurs during the T-state TVE for the case in which the status for the beginning of an external read or write operation can be fed to an external BUS, and the channel-specific data assembly register DAR of the autonomous data processing unit DHU is addressed by a clock pulse CL or by a read signal.

For reasons of optimum utilization of the microcode stored in the internal memory ROM, a hardware device has been provided which makes it possible to achieve the entire organizational transfer for loading the ADMA registers CR, PR from the memory which advantageously has a command block, with only a single set of so-called "SETUP" microcommands. This is done independently of the BUS width, which may be 8 bit or 16 bit, of the organization memory connected to the ADMA in which the channel program of the ADMA is stored, and independently of whether the command pointer address is even or odd.

There are two possibilities which lead to a split case and therefore to the application of the T-state TW:

An organizational or a "direct memory access" word access of an ADMA with an odd address ("BIU ODD ADDRESS SPLITTING").

A desired organizational word access to the memory with a BUS connection of only 8 bits ("BIU PHYSICAL SPLITTING").

In both of these cases, the desired word access of the microprogram is converted by an autonomous unit, the BUS-interface unit BIU, into an actual desired byte access. Thereupon, the external address is incremented by 1 and a second byte access is controlled again independently, without a request for a new microcommand. The marking of the T-state TW serves to block the status evaluation of a match-and-verify-unit, as well as to inform the T-state generator TSG that two BUS cycles must be executed with one microinstruction, during these split states.

The data-handling unit DHU has an offset control OC and an execution control EC. These controls OC, EC concern the information exchange with external information sources as well as with external information sinks. The microword stored in the intermediate memory MLATCH provides control signals SE for controlling the sequencer SQ, for controlling the byte counter BC, for supplying information for an address point control AC and for a sequencer control SQC, and for supplying information for a control EWC of the external write access.

Through the use of an apparatus according to FIG. 1, every pointer address can be incremented, decremented or kept constant. With an apparatus according to FIG. 1, any desired physical BUS widths and logical BUS widths can be combined with each other.

Signals which are designated with reference symbol PRIO in FIG. 1, enable one channel each to be prioritized.

Figure 2:
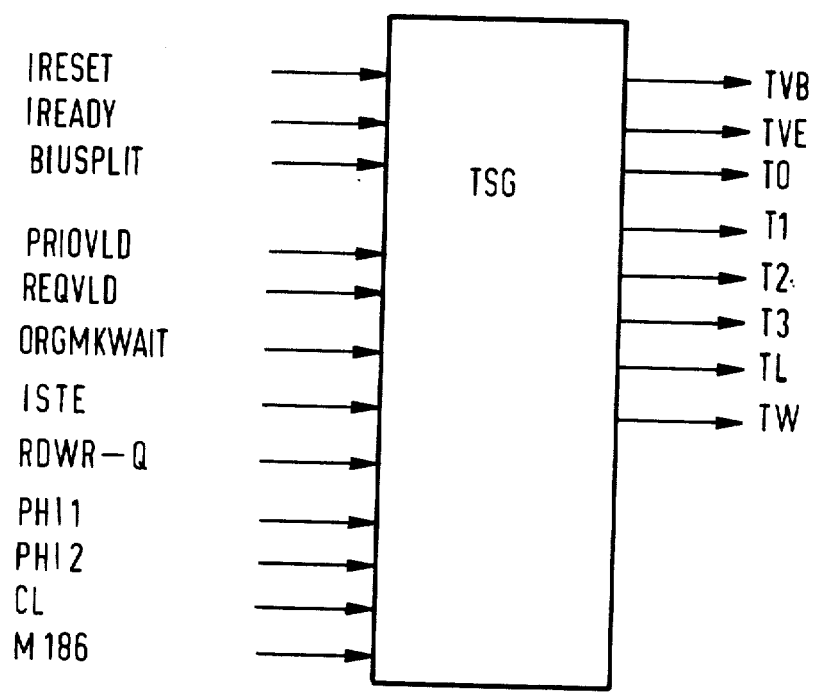
FIG. 2 is a block diagram of a T-state generator according to the invention.
Figure 3:
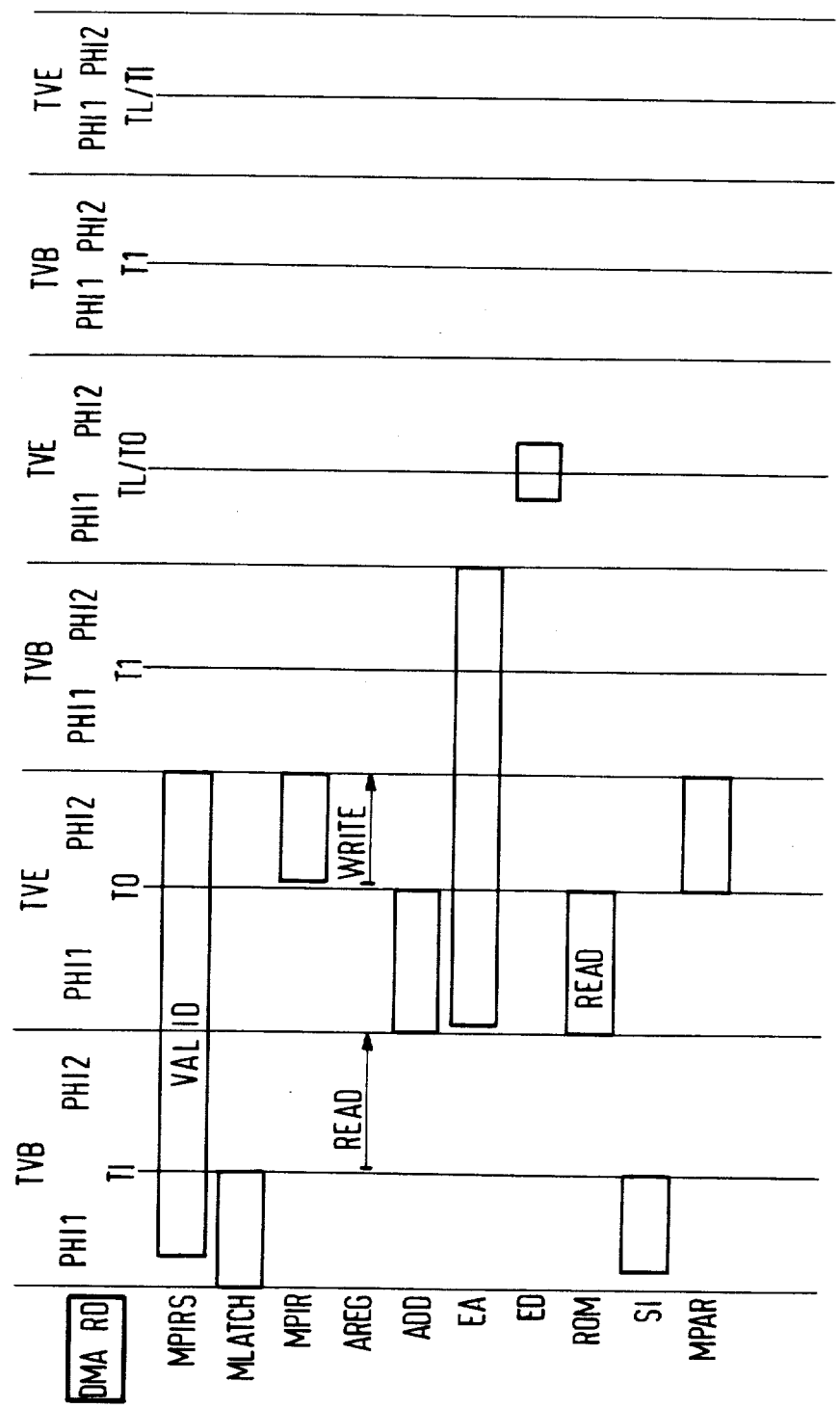
FIG. 3 is a timing diagram of an M286 ADMA.

If the ADMA-specific T-states are superimposed on the T-states required for the Intel-timing in a suitable manner, transition and state diagrams which will be explained with reference to FIGS. 3 and 8 are produced. The transfer conditions in the mode-state diagram depend on the parameters which will be explained in connection with FIG. 2.

FIG. 2 is a block diagram of the T-state generator TSG according to the invention with the following parameters:

T0, T1, T2, T3, TL, TI, TVB, TVE, TW (presence of the instantaneous T-state or a combination of T-states).

The other reference symbols used in FIG. 2 represent signals which have the following meanings:

PRIOVLD: Validity of a started microinstruction (interrogated during the T-state TVB).

REQVLD: Validity of the current microinstruction (interrogated during the T-state TVE).

M186: BUS-interface mode of the module (the M186 ADMA is activated if the module operates in the M186 mode).

ORGMKWAIT: Identification of a waiting state which is not necessary if a read operation from the organization memory, the so-called "ORG RD" instruction, is followed directly by the write operation on the organization memory ("ORG WR" instruction) of the ADMA. The duration of a waiting state is two T-states.

RDWR: Marking a microinstruction which is to execute a "read" or "write" on the external BUS. In the case of microinstructions which carry out organizational address computations internal to the ADMA, i.e. which require no external activities at the BUS, RDWR is inactive. ISTE Internal status enable: This signal indicates whether the status for the beginning of an external read or write operation can be impressed as an output on the external BUS. A condition for the activation of the ISTE is, among other things, a desired access of the currently active microinstruction to the external BUS, if the preceding microinstruction may have already been terminated (presence of an activated IREADY-signal).

IREADY: Internal READY: A signal which indicates whether or not it was possible to successfully complete a microinstruction with external BUS activity. The termination of a BUS cycle is acknowledged by the memory or peripheral equipment by a "READY" signal. In the absence of this READY signal from the passive external partner, a given T-state combination is repeated in dependence on the BUS interface mode.

BIUSPLIT: A signal for recognizing a split case: This signal controls a clock generator and the BUS interface unit BIU in the execution of two BUS cycles per microinstruction, if a desired word accress is split, for instance, into two byte accesses (the description of the T-state TW should also be referred to for these conditions).

The two signals PRIOVLD and REQVLD are shown in FIG. 1 in a combined form as the signals PRIO. The signal IRESET indicates that an internal reset process is taking place. The two phases PHI1 and PHI2 are controlled by a clock generator which in turn is driven by the clock signal CL. The post-script "−Q" after a signal designation means that the signal designated thereby is present in inverted form. All of the T-states are evaluated by the ADMA during the phase PHI1. If a T-state is still required for the phase PHI2, it must be stored in the interim with the phase PHI1 in a latch, by a transfer gate in the respective unit in which it is required.

FIG. 3 illustrates an M286 ADMA timing diagram. Data are to be read in this case from a data source. During the T-state TVB with the phase PHI1, the microprogram instruction register MPIR of the prioritized channel in the ADMA is selected and a microprogram latch MLATCH is transferred. While still in the T-state TVB with the phase PHI1, the channel-specific sequence link is generated in the sequencer by incrementing the preceding microaddress by means of a signal SI. As long as the selected microcommand from the register MPIR is valid, the signal MPIRS is active.

For the T-state TVB with the phase PHI2, an external address is read from the internal ADMA pointer register set PR over an activated signal AREG, where the data are to be read out. At the same time, this external address is stored in the intermediate adder memory ADD1 and transferred to an address buffer in the BUS interface unit BIU.

Since neither a T0 nor a T1 T-state was present during the just described T-state TVB, the T-state TI was present simultaneously with the T-state TVB.

For the T-state TVE with the phase PHI1, a new external address is generated in the adder ADD and re-written into the address register AREG during the T-state TVE with the phase PHI2. During the T-state TVE with the phase PHI1, the internal microcode read-only memory ROM is read. The ROM output data which are stable with respect to the T-state TVE with the phase PHI2, are written into the channel-specific register MPIR if the currently processed microinstruction is valid. Simultaneously with this entry into the register MPIR, the corresponding microprogram address is also transferred into the channel-specific microprogram at this register MPAR. Simultaneously with the T-state TVE, the T-state T0 is present for the instantaneously valid microcommand: During the T-state T0 and during the subsequent T-state T1, the external address EA is active. During the subsequent T-state TL, the external data ED are taken over by the ADMA.

Figure 4:
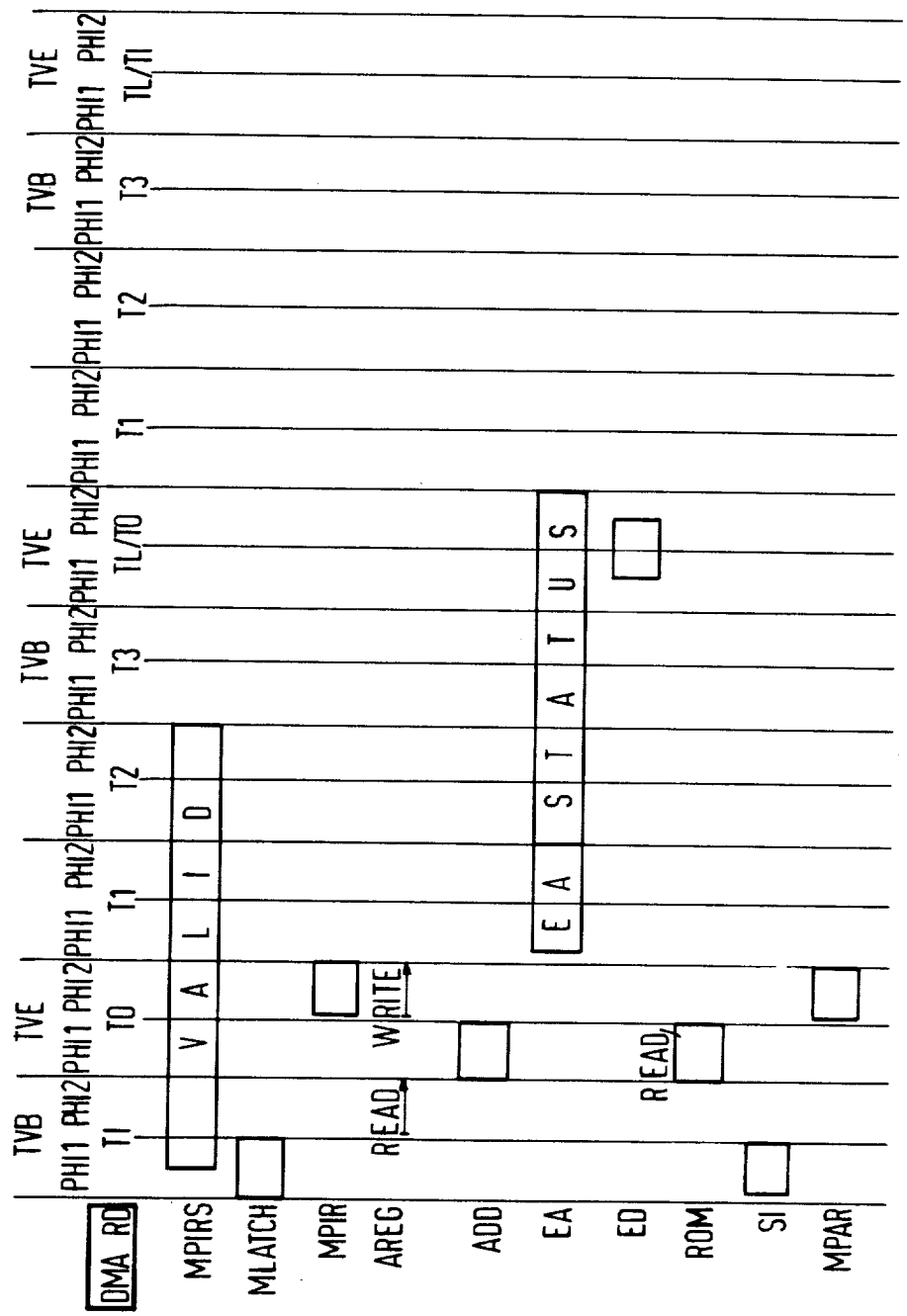
FIG. 4 is a timing diagram of an M186 ADMA.

FIG. 4 shows an M186 ADMA timing diagram. The timing diagram of FIG. 4 describes the reading of data from an external data source, similar to the diagram of FIG. 3. Differences between the diagrams of FIG. 3 and FIG. 4 result exclusively from differences between the modes M186 and M286. In the case of the M186 mode there are two additional T-states, namely T2 and T3. During the T-states T2 and T3, status information is substantially given out. Toward the end of the T-state T3, the external data ED are taken over by the ADMA.

FIG. 5 is a T-state diagram for BUS cycles in the M186 mode and the M286 mode. It can be seen in FIG. 5 that for both modes, the T-state TL of a BUS cycle basically overlaps the T-state T0 of the immediately following BUS cycle. It is thereby possible, in the M286 mode, to obtain BUS cycle times of two T-states, and in the M186 mode, to obtain BUS cycle times of four T-states. If no valid selection MPIRS of a microcommand register is present during the T-state T0 of a BUS cycle; then the T-state TL overlaps such a BUS cycle with the T-state TI. This T-state TI continues until a valid selection MPIRS of a microcommand register MPIR is present (see FIG. 3 and FIG. 4 as well). In FIG. 5, the overlap of a first BUS cycle B1, a second BUS cycle B2 and a third BUS cycle B3 is shown as a function of the time t.

Figure 6:
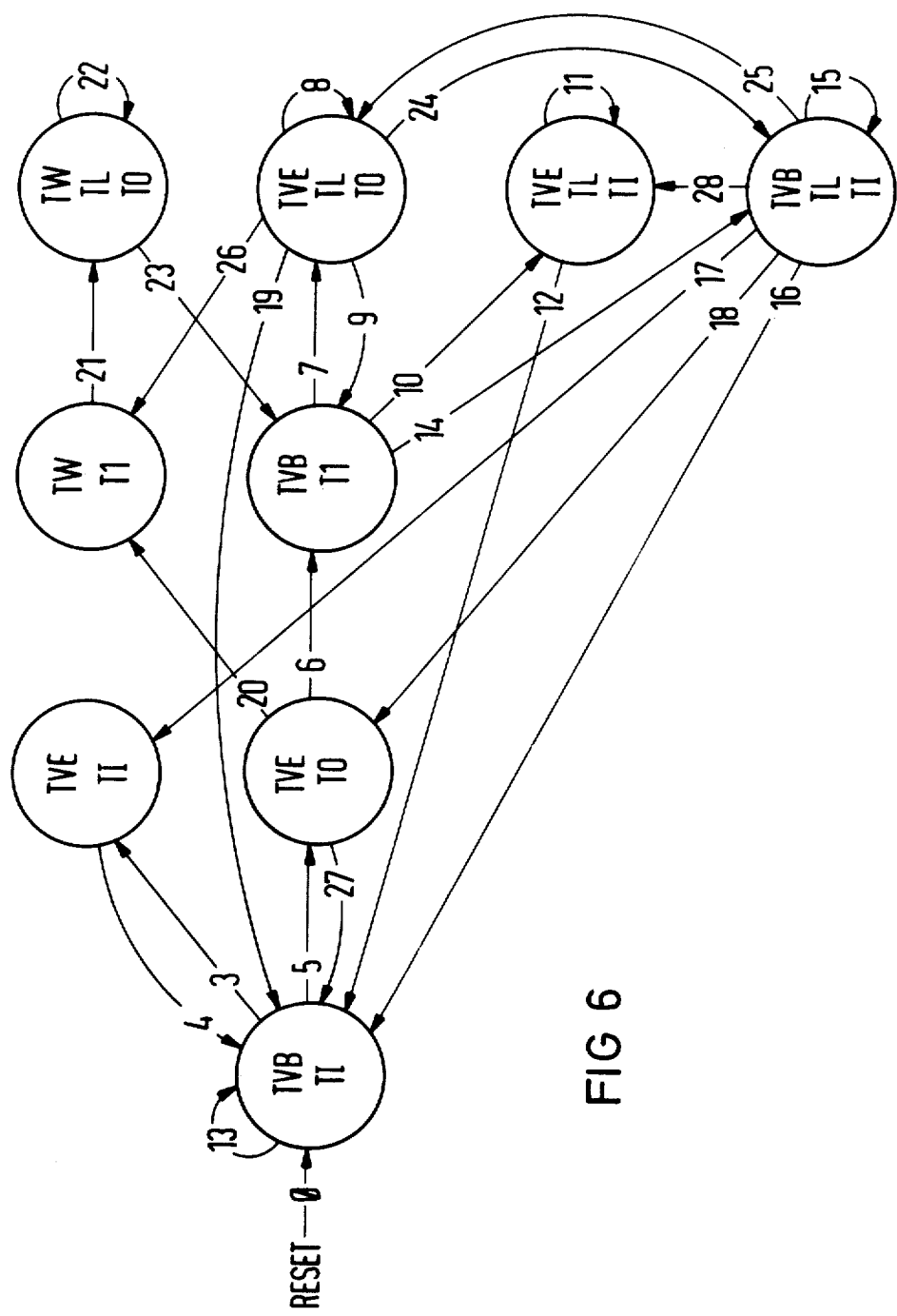
FIG. 6 is a state diagram of an M286 mode.
Figure 7:
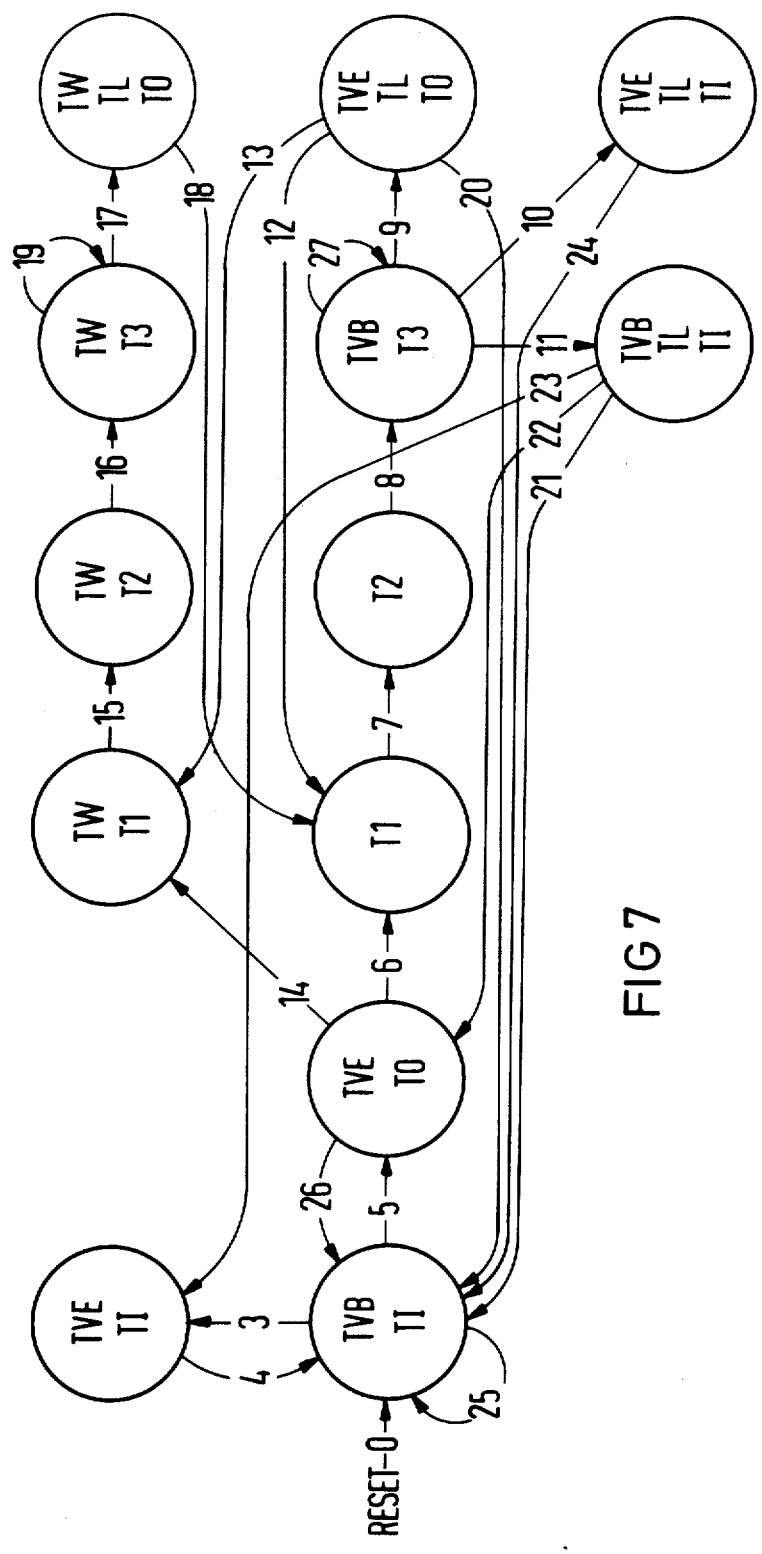
FIG. 7 is a state diagram of an M186 mode.

FIG. 6 shows an M286 mode-ADMA state diagram. FIG. 7 shows an M186 mode-ADMA state diagram. These state diagrams have large circles between which transfers that are designated with reference numerals are possible. Each large circle represents a state which is characterized by an overlap of the T-state indicated in the large circle in question. The T-states shown in a large circle are to be understood to mean that during the state represented by this large circle, the T-states shown in this large circle are active and the T-states not shown in this large circle are inactive. The transition from one large circle to another large circle takes place as a function of the particular T-states which are active in the first large circle and the particular parameters which are present at the T-state generator TSG. Differences between the diagrams of FIG. 6 and of FIG. 7 again only result from differences between the M186 mode and the M286 mode.

FIG. 8 shows transition conditions for the ADMA state diagrams of FIG. 6 and FIG. 7. The truth table of FIG. 8 is divided in such a manner that an inquiry is made as to whether or not a given T-state is active in the transition to a large circle in the state represented by the given circle. The criterion as to whether or not a transition is possible from a given state to the next state in which a particular T-state is active, is given with a reference symbol in abbreviated form as NT-state (NEXT T-state): NTI, NTVB, NTVE, NT0, NT1, NT2, NT3, NTL, NTW. As the next state of the T-state TI, the T-state TI occurs if neither the T-states T0 nor T1 nor T2 nor T3 are active in the next state. Mathematically this means:

$$NTI = (NT0 \text{ or } NT1 \text{ or } NT2 \text{ or } NT3) - Q.$$

An upwardly-directed arrow refers to the logical linkage "AND". A "V" represents the logical interconnection "OR". The numbers in the transitions in FIG. 8 correspond to the numbers in the small circles in the transition in FIGS. 6 and 7. The designation for the numbers of the transitions in FIG. 8 is read from the column U: M186 for transitions in the M186 diagram and in the column U: M286 for transitions in the M286 mode state diagram.

The respective parameters in the form of transition conditions are given in the column BE. As an example, it is seen from FIG. 8 that the following is described in greater detail by referring to line 20: Line 20 means that the next T-state of the T-state TVE is activated if the following parameters instantaneously apply: TVB active and TI active and TL inactive and PRIOVLD active. The corresponding transitions can be observed in the diagrams of FIG. 6 and of FIG. 7 under the transition numbers 3, 5. These transitions 3, 5 can further be separated by asking under which conditions in the column BE the T-state T0 becomes the next T-state, or alternatively, the T-state TI.

All of the input parameters for the T-state generator TSG (the signals CL, PHI1, PHI2 do not belong to these input parameters), which are not explicitely recited in the respective line from line 01 to line 48 in FIG. 8 in the column BE, are inactive in the respective transition from one state to the next state.

If the truth table of FIG. 8 is known, it is a simple matter to provide a T-state generator TSG. A condition required for this is a clocked system. The T-state generator TSG can be provided in the form of a synchronous switching mechanism as a "programmable logic array" (PLA) with a regular structure. To this end, one only requires the knowledge from the textbook by C. Mead and L. Conway: entitled "Introduction to VLSI Systems", published by Addison-Wesley, Chapter 3.10 "The programmable logic array", the truth table of FIG. 8, and the knowledge of the block diagram of the T-state generator TSG of FIG. 2, in order to immediately provide the switching mechanism for the T-state generator TSG. The output signals of the T-state generator TSG can be stored in the interim in a flip-flop row with clocked RS flip-flops. Generation systems are already available which generate a switching mechanism up to the layout stage such as LOGE, University of Karlsruhe, Federal Republic of Germany, starting from the state table analogous to FIG. 8.

In a state in which TVE, TL and T0 overlap, for instance, two different microcommands may be in process and a third microcommand may be in the pre-decoding stage: The first microcommand is processing the read phase, the second microcommand is in the execution phase (such as output, external address) and the third microcommand is in sequencing, reading from a ROM or pre-decoding.

An added aggravating factor for the microprogram control is that a channel change must be possible after each command execution. Because of the high performance required, such a change from one channel to another takes place without influencing the pipeline chain (PIP). This can mean, for instance, that for channel 2, a command is read from the ROM and is pre-decoded; that the command execution, however, takes place subsequently for a command of channel 1, while at the same time a read phase is still being processed for channel 2. The execution phase (minimal command time) lasts for 250 ns.

The register CR includes control registers which are specific to a channel. The register PR contains the addresses of the data source and the data sink. In addition, there is also a byte counter register, which indicates how many bytes are included in a data transfer. All of these registers are loaded in a "SETUP" of the ADMA.

The foregoing is a description corresponding in substance to German Application No. P 32 41 378.5, dated Nov. 9, 1982, the International priority of which is being claimed for the instant application, and which is hereby made part of this application. Any material discrepancies between the foregoing specification and the aforementioned corresponding German application are to be resolved in favor of the latter.

We claim:

1. Integrated microprogrammed device for controlling information processing cycles, including T-states of a first type having no overlap with preceding nor succeeding T-states, the apparatus further comprising means for generating one or more T-states of a second type in dependence on preceding T-states and wherein each T-state of the second type is timingly overlapping at least one T-state of the first type.

2. Integrated microprogrammed device according to claim 1, including means connected to said generating means for selecting a microcommand and for storing the microcommand for a given interim period.

3. Integrated microprogrammed device according to claim 1, including means connected to said generating means for storing an external address for a given interim period.

4. Integrated microprogrammed device according to claim 1, including means connected to said generating means for providing a microcommand sequence address link for a current microcommand address.

5. Integrated microprogrammed device according to claim 1, including means connected to said generating means for providing a sequence link command.

6. Integrated microprogrammed device according to claim 1, including means connected to said generating means for storing a microcommand address belonging to a current microcommand.

7. Integrated microprogrammed device according to claim 1, including means connected to said generating means for generating a new external address.

8. Integrated microprogrammed device according to claim 1, including means connected to said generating means for converting a word access request of a microprogram into an actual byte access request.

9. Integrated microprogrammed device according to claim 1, including means connected to said generating means for prioritizing one of a plurality of channels for information transfer.

10. Integrated microprogrammed device according to claim 1, including means connected to said generating means for switching between given BUS timing modes.

11. Method for operating an integrated microprogrammed device, including means for generating one or more T-states in dependence on preceding T-states and on given parameters, a microprogram instruction register for a given prioritized channel being connected to the generating means for storing a microcommand, and a microprogram latch connected to the microprogram, instruction register, which comprises selecting the microprogram instruction register of the prioritized channel during a T-state and transferring the microcommand stored in the microprogram instruction register into the microprogram latch.

12. Method for operating an integrated microprogrammed device according to claim 11, including an internal pointer register set connected to the generating means for carrying a pointer address, an interim memory connected to the internal pointer register set, and an address buffer connected to the interim memory, which comprises, reading the pointer address from the internal pointer register set, storing the pointer address in the interim memory, and transferring the pointer address to the address buffer during a T-state.

13. Method for operating an integrated microprogrammed device according to claim 11, including an internal microaddress interim memory connected to the generating means which comprises providing a sequence link of the current microaddress relative to the same channel, and transferring the sequence link into the internal microaddress interim memory during a T-state.

14. Method for operating an integrated microprogrammed device according to claim 11, including a microprogram address register connected to the generating means, which comprises providing a sequence microcommand relative to a channel being processed at a given time, writing the sequence microcommand into the microprogram instruction register for a channel, and transferring a corresponding sequence microprogram address into the microprogram address register for a channel during a T-state.

15. Method for operating an integrated microprogrammed device according to claim 12, which comprises performing an address pointer addition during a T-state to provide a new external address, and rewriting the new external address into the pointer register.

16. Method for operating an integrated microprogrammed device according to claim 11, which comprises converting a desired word access of a microprogram into an actual byte access request during a T-state, and independently controlling at least one other corresponding byte access without requesting a new microcommand.

17. Method for operating an integrated microprogrammed device according to claim 11, which comprises logically concatenating and suitably overlapping the T-states.

18. Method for operating an integrated microprogrammed device according to claim 17, which comprises processing at least two microcommands simultaneously.

19. Method for operating an integrated microprogrammed device according to claim 18, which comprises simultaneously placing: a first microcommand in a read phase, a second microcommand in an execution phase, and a third microcommand in a preparation phase.

20. Method for operating an integrated microprogrammed device according to claim 18, which comprises simultaneously placing: a first microcommand in a read phase, and a second microcommand in an execution phase.

21. Method for operating an integrated microprogrammed device according to claim 18, which comprises simultaneously placing: a first microcommand in an execution phase, a second microcommand in a preparation phase, and the integrated microprogrammed device in an idle state.

* * * * *